United States Patent

Niman

[15] 3,686,574

[45] Aug. 22, 1972

[54] SELF-CORRECTING AFC SYSTEM

[72] Inventor: George J. Niman, Arlington Heights, Ill.

[73] Assignee: The Hallicrafters Co.

[22] Filed: Aug. 19, 1970

[21] Appl. No.: 65,198

[52] U.S. Cl. ......................325/421, 325/422, 331/18
[51] Int. Cl. ............................H04b 1/16, H03b 3/04
[58] Field of Search......325/395, 396, 416, 418, 419, 325/420, 421, 422, 423, 363, 407, 409; 331/18; 334/5, 6, 14, 15, 16

[56] References Cited

UNITED STATES PATENTS 3,499,981 3/1970 Neal et al. .................375/422
3,076,943 2/1963 Cooperman...............325/422
3,569,835 3/1971 Harner.....................325/363

*Primary Examiner*—Robert L. Richardson
*Assistant Examiner*—George G. Stellar
*Attorney*—Hofgren, Wegner, Allen, Stellman & McCord

[57] ABSTRACT

An AFC system includes a tunable LC discriminator having varactor controlled by a voltage from an analog memory. During a frequency error correction period, the output of a crystal oscillator is gated to the LC discriminator, and any discriminator voltage output, representing a frequency error in the discriminator, is gated to the analog memory to correct the tuning of the discriminator.

11 Claims, 2 Drawing Figures

Inventor:
George J. Niman
By Hofgren, Wegner, Allen, Stellman & McCord
Att'ys

SELF-CORRECTING AFC SYSTEM

This invention relates to an AFC system, and more particularly to a self-correcting AFC discriminator having a frequency correction loop.

In AFC systems, crystal controlled discriminators achieve maximum frequency stability, but have an undesirable narrow pull-in range as well as a narrow frequency hold range. The transient response of a crystal discriminator is also poor, resulting in long rise and ringing times when used in gated circuits. These undesirable characteristics have made it necessary to resort to a LC discriminator where a phase lock system is not applicable, and achieve stabilization by temperature compensation. An oven stabilized system, however, is bulky, and long term stability is poor due to again and temperature recycling.

In accordance with the present invention, a self-correcting AFC system is disclosed which combines the desirable characteristics of both crystal controlled and LC discriminators. That is, the present discriminator has good short and long term stability, wide pull-in and hold ranges, and good transient response.

To obtain these objectives, an LC discriminator is modified by the addition of a varactor discriminator frequency tuning circuit. The varactor is controlled by an analog memory circuit. During a frequency error correction period, a crystal controlled oscillator tuned to the discriminator center frequency is gated to the LC discriminator, and any frequency error, as represented by a voltage output, is gated to the analog memory in order to retune the discriminator to its desired center frequency.

One object of this invention is the provision of a self-correcting AFC system using a discriminator periodically returned to maintain a desired discriminator frequency response.

Another object of this invention is the provision of a self-correcting AFC system having a discriminator periodically gated to a source of fixed frequency oscillations. The output of the discriminator during the gating correction period controls a frequency correction loop, thereby obtaining the advantages of crystal stabilization for a discriminator having a wide pull-in range.

Figure 1:
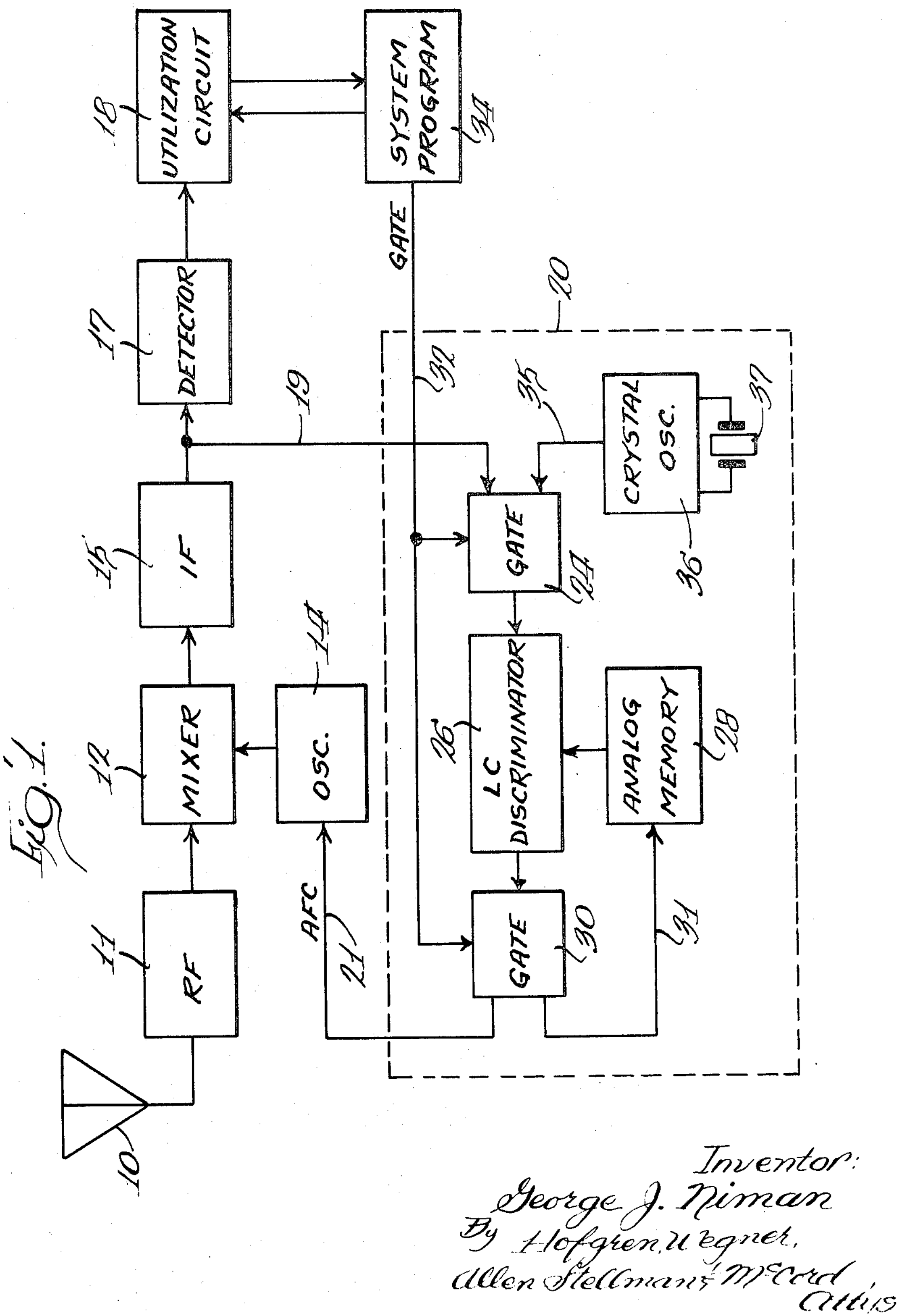
Figure 2:
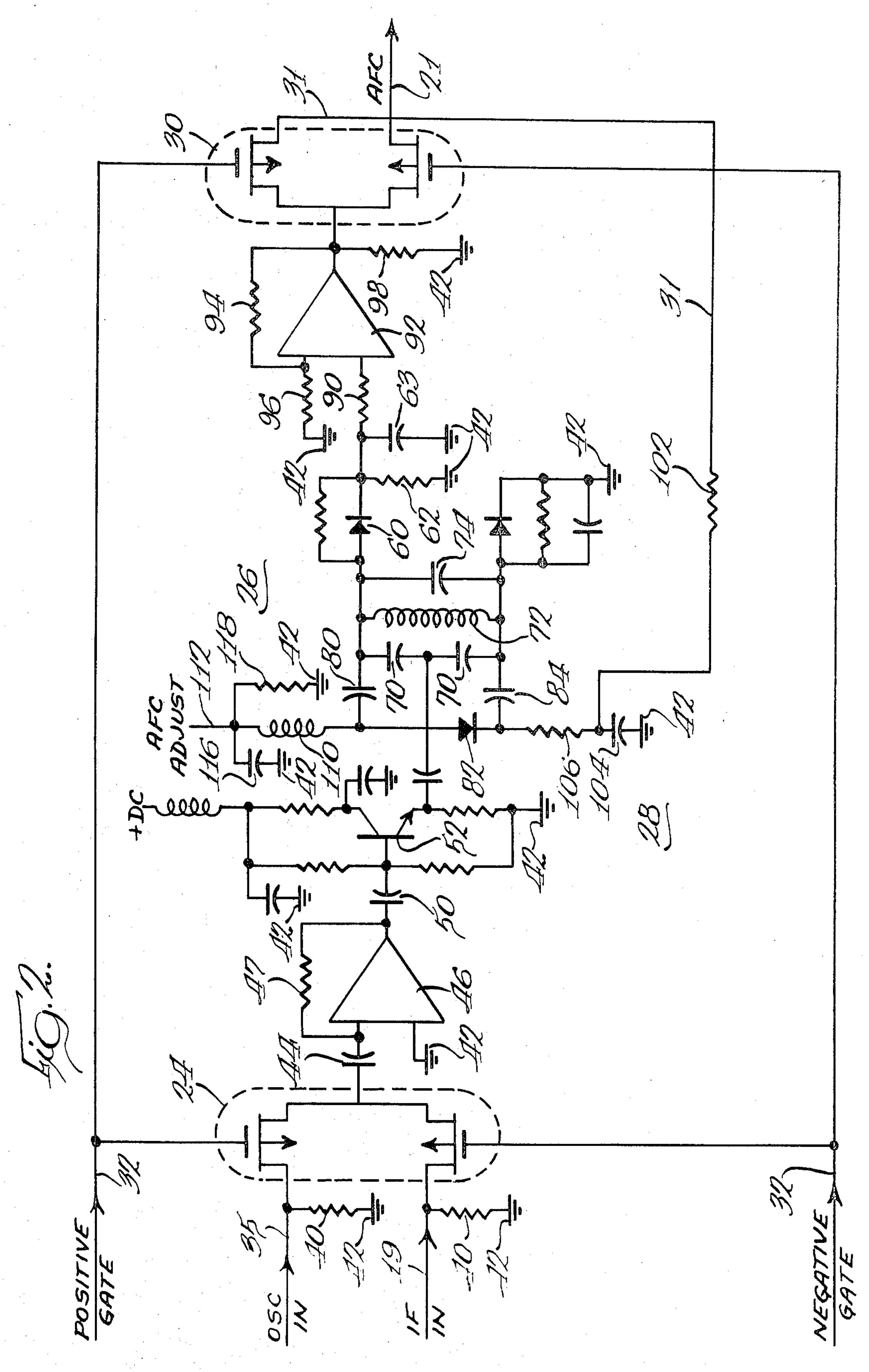

Further objects and advantages will be apparent from the following description, and the drawings, in which:

FIG. 1 is a block diagram of the self-correcting AFC system incorporated in a receiver; and FIG. 2 is a schematic diagram of the AFC system shown in block form in FIG. 1.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values and type designations will be given for certain of the components in order to disclose a complete, operative embodiment of the invention. However, it should be understood that such values and type designations are merely representative and are not critical unless specifically so stated.

In FIG. 1, a typical receiver using an AFC system is disclosed in block form. A wave received on an antenna 10 is coupled through a RF stage 11 to a mixer stage 12. The received wave is mixed with locally generated wave from a local oscillator 14 in order to produce an intermediate frequency output signal which is amplified in an IF stage 15. The amplified IF signal is demodulated in a detector 17 and coupled to a utilization circuit 18, which may have various forms. The output from the IF stage 15 is also coupled by an AFC input line 19 to an AFC system 20 which produces, on an output line 21, an AFC error signal coupled to the local oscillator 14 in order to lock the receiver to the frequency of the incoming wave. Numerous receivers of the above type are conventional and will not be described in further detail.

In accordance with the present invention, a novel AFC system 20 combines the desirable characteristics of both crystal and LC discriminators. The IF signal on line 19 is coupled to a dual input gate 24 which gates a single input to an output line which is coupled to a LC discriminator 26. The LC discriminator 26 is nominally tuned to the center frequency of the IF stage 15, but includes a tunable element, such as a varactor, having a frequency response controlled by the output from an analog memory stage 28. When the input signal to LC discriminator 26 varies from the tuned center discriminator frequency, a DC error signal is produced and coupled to a single input, dual output gate 30. During the normal AFC operation period, gate 30 couples the DC error correction voltage to the AFC output line 21 in order to control local oscillator 14 in a conventional manner. During an AFC self-correction period, gate 30 couples the DC error voltage via a line 31 to the analog memory 28.

Gates 24 and 30 are controlled by gating signals on a gate bus 32, produced from a system program unit 34. The system program unit 34 may take a variety of forms, as will appear, and normally has output signals which open gates 24 and 30 to lines 19 and 21, forming a receiver AFC loop which operates in a known manner to control the local oscillator 14. That is, the IF signal from IF stage 15 is gated to LC discriminator 26, and when the IF signal varies from its desired center frequency, a DC output signal is gated to local oscillator 14. This shifts the local oscillator frequency, to maintain the IF signal from mixer 12 at a desired intermediate frequency. Without the self-correcting feature described hereafter, LC discriminator 26 would exhibit a long term frequency drift, undesirably producing a DC output signal even though the IF signal was at the desired IF center frequency.

To correct AFC system 20, the system program unit 34 periodically generates a correction pulse which switches gates 24 and 30 from the AFC loop to a discriminator correction loop. Gate 24 now blocks the IF signal on line 19, and gates to discriminator 26 highly stable oscillations on an output line 35 from a crystal controlled oscillator 36. The frequency output of oscillator 36 is determined by a piezoelectric crystal 37 tuned to the desired IF center frequency. If LC discriminator 26 has not drifted from the same center frequency, then no DC output voltage is produced. However, if an output voltage is produced (indicating an undesired frequency drift in discriminator 26), analog memory unit 28 receives an input from gate 30. The unit 30 stores the voltage and controls the tuning element in discriminator 26 in a direction to return the discriminator to the desired IF center frequency. After the lapse of a time period sufficient to allow the correction to have occurred, system program unit 34 terminates the correction pulse and generates a normal gating pulse which returns the AFC system 20 to normal operation.

System program unit 34 may take a variety of forms depending upon the form of the receiver. When used in a transceiver, activation of the transmit mode may be used to activate the self-correcting mode of the AFC system. In ECM jammer systems, for example, the transmit period is relatively long compared with the receive period, and the correction period is accordingly long, simplifying the form of the analog memory 28. A form of memory 28 suitable for use in such a system consists of a capacitor integrator. When longer or continuous receive periods are contemplated, analog memory 28 may take the form of a Miller integrator or other long time constant memory. Where the receiver continuously receives a wave, system program unit 34 may take the form of a free running multivibrator periodically generating short duration pulses which activate the self-correcting mode.

Turning to FIG. 2, a detailed embodiment for the AFC system 20 shown in block form in FIG 1 is illustrated. The crystal controlled oscillator 36, not illustrated in FIG. 2, may take any conventional form. Both the input gate 24 and the output gate 30 may be formed from a pair of MOS insulated gate field effect transistors (FETs), as type 3N166 The pair of input FETs which form gate 24 are directly coupled to lines 35 and 19, and are shunted through a pair of 47 ohm resistors 40 to a source of reference potential or ground 42. The outputs of the FETs are coupled together and through a 0.01 microfarad capacitor 44 to an operational amplifier 46 connected to function as a limiter. A 10 kilohm resistor 47 is coupled between the output and the ungrounded input of the operational amplifier 46.

The amplitude limited output is coupled through a 0.01 microfarad capacitor 50 to a NPN transistor 52, as type 2N918, which drives a discriminator 26 of known construction, except for the addition of a variable tuning element. The voltage output level of the discriminator is detected by a diode 60 and coupled across a parallel connected 6.2 kilohm resistor 62 and a 0.01 microfarad capacitor 63. The center frequency of the discriminator 26 is determined by the LC time constant of the discriminator, and is selected to correspond with the desired center IF signal frequency. The time constant is determined, for example, by a pair of 68 picofarad capacitors 70, the junction therebetween being capacity coupled to the output from transistor 52. A 12.5 microhenry inductor 72 and a 4.7 picofarad capacitor 74 are coupled in parallel across the series connected capacitors 70. Inductor 72 may have a Q of approximately 80 at 4.5 megahertz. Also coupled in parallel with the pair of capacitors 70 is a 270 picofarad capacitor 80, a varactor diode 82, as type IN 5148, 1N5148, and a 270 picofarad capacitor 84. The varactor diode 82 forms a tunable capacitor having a capacitance determined by the voltage thereacross.

The output of discriminator 26, through diode 60, is coupled through a 10 kilohm resistor 90 to one input of an operational amplifier 92. A 4 megohm resistor 94 is coupled between the output of operational amplifier 92 and another input. A 13 kilohm resistor 96 shunts the input to ground 42. The circuit forms an amplifier which develops an amplified error voltage across a load resistor, in the form of a 5.6 kilohm resistor 98, for connection to the output gate 30.

One FET in gate 30 connects line 31 to a 270 kilohm resistor 102 and a 0.47 microfarad capacitor 104 to ground 42. The junction between resistor 102 and capacitor 104, which forms analog memory 28, is coupled through a 5.6 kilohm resistor 106 to the cathode of the varactor diode 82.

In operation, the gate lines 32 normally have a negative voltage thereon, activating the two lowermost illustrated FETs in gates 24 and 30. This couples the IF line 19 to limiter 46 and thence to the LC discriminator 26. Any deviation of the IF signal from the center tuned frequency results in a voltage level across capacitor 63, which is amplified by operational amplifier 92 and gated to AFC output line 21. The pull-in range of the LC network is substantial, and greatly in excess of the pull-in range of a crystal discriminator.

During the self-correction period, a positive voltage is coupled to the lines 32. This activates in gates 24 and 30 the two uppermost illustrated FETs. Crystal controlled oscillations on line 35 are now coupled to limiter 46 and hence to discriminator 26. If no frequency drift has occurred, a zero volt DC level will be produced across capacitor 63. However, if a frequency drift has occurred, a DC voltage level is developed, amplified, and then coupled via line 31 to capacitor 104. At the end of the correction period, the voltages on lines 32 are returned negative, disabling lines 35 and 31.

The time constant of the integrator 28 is sufficiently long to store for use during normal AFC operation the error correction voltage, and exceeds the repetition rate of the positive gate pulses. This voltage is coupled through resistor 106 to varactor diode 82, retuning the discriminator to the desired IF signal center frequency. Thus, the stability of the crystal controlled oscillator controls the tuning of the LC discriminator. If desired, the center frequency of discriminator 26 may also be externally adjusted by an external voltage coupled to varactor diode 82. For this purpose, a 470 microhenry inductor 110 may be coupled between the anode of varactor diode 82 and a line 112 connected to an external AFC adjust voltage. The line 112 is shunted to ground 42 through a 0.01 microfarad capacitor 116 and a 200 ohm resistor 118. While a particular LC discriminator 26 has been illustrated, it will be apparent that other types of LC discriminators may be used in place thereof, with the addition of varactor diode 82 connected so as to allow adjustment of the LC time constant of the discriminator.

I claim:

1. An automatic frequency control system for controlling the frequency of a local oscillator, comprising:

a source of input signal;

discriminator means connected to said local oscillator and tuned to generate an output signal desirably varying about a reference level as the frequency of said input signal varies about a reference frequency, said discriminator means including a variable element tunable by a correction signal to change the level of said output signal for a given frequency of said input signal;

input means for coupling to said discriminator means an input signal from said source having a frequency related to the frequency of said local oscillator;

output means for coupling the output signal of said discriminator means to said local oscillator;

correction means for producing a correction signal when the output signal of said discriminator means is different than said reference level for input signals having said reference frequency; and returning means coupling said correction signal to said variable element to retune said discriminator means.

2. The automatic frequency control system of claim 1 wherein said discriminator means includes inductive means and capacitive means tuned to said reference frequency, said variable element comprises a reactive element forming a part of said inductive and capacitive means, and said correction means produces a DC voltage, corresponding to said correction signal, for tuning said reactive element.

3. The automatic frequency control system of claim 1 wherein said retuning means includes an analog memory for storing said correction signal during a recurring time period.

4. The automatic frequency control system of claim 3 wherein said retuning means includes gate means actuable to divert the output signal of said discriminator means from said local oscillator to said analog memory, and program means for actuating said gate means.

5. The automatic frequency control system of claim 1 wherein said correction means includes a reference oscillator for generating a reference signal at said reference frequency, and gate means actuable for coupling said reference oscillator to said discriminator means to cause said reference signal to form said input signal, whereby the output signal of said discriminator means when said gate means is actuated corresponds to said correction signal.

6. The automatic frequency control system of claim 5 wherein said reference oscillator comprises an oscillator controlled by a piezoelectric crystal tuned to said reference frequency.

7. In a receiver having local oscillator means coupled to mixer means in order to produce an intermediate frequency signal, an automatic frequency control system, comprising:

discriminator means tuned to generate an output signal varying about a first level as the frequency of an input signal varies about said intermediate frequency;

input means for coupling the intermediate frequency signal from said mixer means to said discriminator means;

output means for coupling the output signal of said discriminator means to said local oscillator means to control the frequency of said intermediate frequency signal;

reference oscillator means for generating a reference signal at said intermediate frequency;

gate means actuable for coupling said reference oscillator means to said discriminator means in place of said input means to cause said reference signal to form said input signal; and correction means responsive to the output signal of said discriminator means when said gate means is actuated for retuning said automatic frequency control system to cause said mixer means to produce said intermediate frequency signal.

8. The automatic frequency control system of claim 7 wherein said discriminator means comprises a LC tuned network having a wide frequency bandpass, and said reference oscillator means comprises a crystal controlled oscillator using a piezoelectric crystal having a resonant frequency curve substantially narrower than the bandpass of said LC tuned network.

9. The automatic frequency control system of claim 7 wherein said correction means includes an analog memory for storing said correction signal while said gate means is unactuated.

10. The automatic frequency control system of claim 9 including program means for periodically generating a gating signal, means coupling said gating signal to said gate means to cause actuation thereof, and said analog memory comprises a RC network having a time constant longer than the repetition rate of the gating signal from said program means.

11. The automatic frequency control system of claim 7 wherein said discriminator means includes a frequency variable element tunable by said correction signal to change the level of said output signal for a given frequency of said input signal, and said correction means includes means responsive when said gate means is actuated for coupling said output signal from said discriminator means to said variable element to retune said discriminator means.

* * * * *